United States Patent Office 3,093,046
Patented June 11, 1963

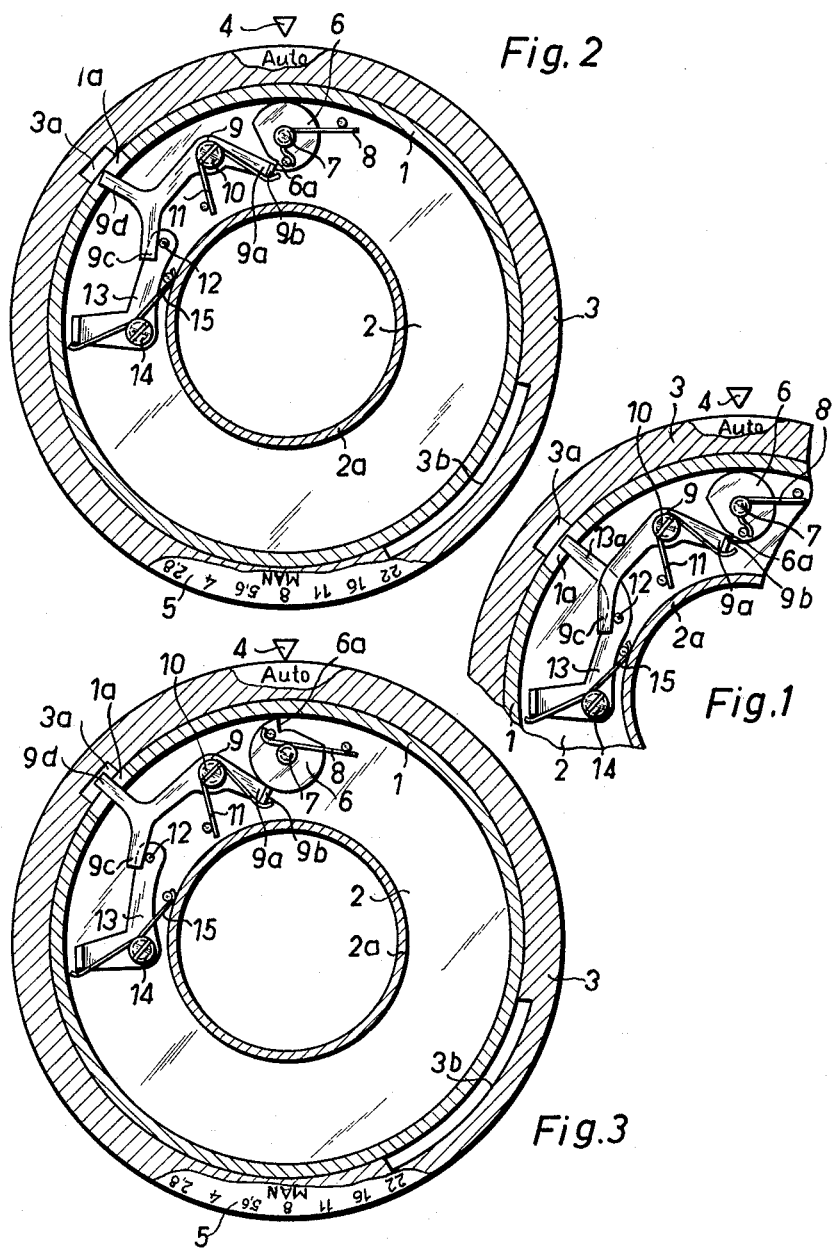
June 11, 1963  F. W. R. STARP  3,093,046
PHOTOGRAPHIC CAMERA
Filed May 19, 1960
INVENTOR
Franz Wilhelm Reinhard Starp
BY March, Gillette, Virgil & Eslinger
Attorneys

3,093,046
PHOTOGRAPHIC CAMERA
Franz Wilhelm Reinhard Starp, Calmbach (Enz), Germany, assignor to Alfred Gauthier, G.m.b.H., Calmbach (Enz), Germany, a corporation of Germany
Filed May 19, 1960, Ser. No. 30,370
Claims priority, application Germany May 20, 1959
4 Claims. (Cl. 95—53)

This invention relates to photographic cameras of the type wherein either automatic or non-automatic exposure settings may be effected, and wherein a manually operable switch or selector member is settable at "Automatic" and "Non-Automatic" positions to obtain the desired type of exposure.

In order to insure the obtaining of correct and proper exposures when taking photographs using either an automatic or a non-automatic exposure setting in cameras of the above type,, it is necessary that, prior to opening the shutter and exposing the film, the selector or switch member be exactly in the desired setting position, either at the "automatic" or the "non-automatic" position corresponding to the type of setting which is to be made. If the selector member is not in the correct position, as for example if the member occupies an undefined intermediate, not significant position during an exposure, the exposure setting devices may under certain circumstances fail properly to operate, and this will result in defective photographs being had.

It is an object of the present invention to provide a novel and improved camera of the above described kind, wherein there is insured at all times the proper placement of the selector member as a condition to operation of the shutter, so that said member occupies the exact setting necessary to obtain correct operation of the setting devices and consequently a proper exposure of the film, thus being effected by the use of an extremely simple mechanism involving relatively few parts and low cost.

This object is accomplished, in accordance with the invention, by the provision of a novel releasable interlock or locking device for the camera shutter release, which device is rendered operative whenever the selector member which controls the "automatic" and "non-automatic" settings of the camera is in any intermediate positions, other than the said "automatic" and "non-automatic" positions.

The invention thus provides the important advantage, in cameras of the general type set forth above, that it is only possible to make an exposure, either when utilizing the automatic or the non-automatic exposure mechanism, if the selector member is fully positioned in the desired setting associated with the type of exposure which is to be utilized. By such procedure there is completely eliminated the taking of defective photographs resulting from improper setting of the selector member in an intermediate, non-defined position.

An especially simple and economical construction of releasable interlock or locking device for the camera shutter release, as provided by the invention, is obtained when the selector member is arranged to have portions which are disposed in the path of movement of a movable part of the shutter release device, said selector member preferably having two openings or recesses into which the said part can be shifted and which said part may occupy when the selector member is fully placed in either its "automatic" or "non-automatic" position, thereby to enable the shutter to be actuated or released.

In accordance with a further construction provided by the invention, there is arranged, in addition to the releasable interlock or locking device for the camera shutter release, an additional locking device which permits shifting of the selector member from its automatic position to its non-automatic position and vice versa only if the camera shutter drive mechanism is set or cocked.

This further construction as provided by the invention is of special importance in those cameras where, owing to the structure and method of operation of the exposure setting devices, a change from one kind of setting to the other kind of setting must be effected only if the shutter is in its cocked position.

The said additional locking device for the selector member may be constructed in various ways. Such a locking device may, for example, be made to include the said movable part of the shutter release device, thereby resulting in a particularly advantageous, economical arrangement. The said movable part may be cooperable with the openings or recesses of the selector member, and may be held in the said recesses until after the cocking of the shutter drive mechanism has been completed, by means of a movable component of the shutter drive mechanism, as for example the main driving member of such mechanism.

Two embodiments of the invention are illustrated in the accompanying drawings, in which:

FIG. 1 is a fragmentary transverse sectional view through a photographic intra-lens shutter construction, taken at the rear of the front cover plate and illustrating a releasible locking means acting on the shutter or camera release device, said locking means being rendered operative for certain intermediate, non-significant positions of a selector member, as provided by the invention. All members or components of the shutter construction which are not essential for an understanding of the invention have been omitted for the sake of clarity of illustration. The shutter driving mechanism is in the set or cocked position.

FIG. 2 is a full transverse sectional view taken through a photographic intra-lens shutter construction, illustrating a modified form of locking means for the shutter or camera release device, and further showing an additional locking means acting on the selector member. In this figure the shutter drive mechanism is also illustrated in the cocked condition.

FIG. 3 is a view like that of FIG. 2, but showing the shutter drive mechanism in its uncocked or run-down position. The said additional locking means acting on the selector member is shown in the operative position.

Referring now to the figures, the housing or case of the photographic intra-lens shutter construction is designated by the numeral 1. Within the housing 1, there is provided the usual type of base plate 2, arranged to carry the members of the shutter mechanism in a well-known manner. The shutter base plate 2 has a short tubular nozzle 2a which serves to receive lenses of the photographic lens assemblage.

For the purpose of selecting exposure settings which are to be effected either manually (non-automatically) or else automatically, there is provided on the outer periphery of the side wall of the housing 1 a manually operable selector member or ring 3, which is settable in either "automatic" or else "non-automatic" positions. These two positions of the reversing or selector member are identified, in the illustrated embodiment of the invention, by the symbols "Auto" and "Man," which symbols are arranged on the ring 3 and are referable to a fixed setting mark 4. When the selector ring 3 is in the "Auto" position, the exposure setting is effected automatically in response to operation of a well-known exposure regulator, said setting in the present case involving an adjustment of the diaphragm. When the adjusting operation is to be effected manually or non-automatically, the selector ring 3 is placed in the "Man" position. For this purpose, the ring 3 has a diaphragm scale 5 (FIGS. 2 and 3) which is associated with the symbol "Man"

and which cooperates with the aforementioned fixed setting mark 4.

Details concerning the construction of the automatic and manual setting mechanisms have been omitted from the figures for the sake of clarity of illustration, and since their operation and construction are well understood in the art and are not necessary to an understanding of the present invention. Data relating to manual and automatic setting mechanisms which are suitable for use in the camera of the present invention are disclosed and described in the copending application for Camera filed Dec. 24, 1959, Serial No. 861,917, owned by the assignee of the present invention. One such setting mechanism may, for example, be constructed in such a manner that the selector and manually operable diaphragm setting ring 3, as well as another setting ring, which can be shifted automatically by means of a driving device into a position determined by the exposure regulator of the camera, is tensionally connected to the diaphragm, as by a unidirectionally positive driving connection, in which case for the "automatic" position the selector member and manual diaphragm setting ring 3 is, at the start of the exposure (at the very latest), in a setting position which is correlated with one end position of the diaphragm and wherein the control influence of the selector member is eliminated. Also, for the "non-automatic" position of the ring 3 the automatically movable setting ring is, at the start of the exposure (at the very latest), in a setting position which is correlated with the said one end position of the diaphragm and wherein the control influence of the automatically movable setting ring is eliminated.

A diaphragm setting device constructed in this manner has, for example, been illustrated and described in the above identified patent application.

The shutter driving mechanism comprises a tensioning and driving disc 6, which is rotatable about an axis 7 and is acted on by a driving spring 8. A well known setting or cocking device (not shown for reasons of clarity of illustration) which acts upon the axis 7 directly or else by means of a transmission gear, effects a turning of the driving disk 6 into the cocked position shown in FIGS. 1 and 2. The disk 6 is held in this cocked position by an arresting lever 9 which is positioned on the shutter base plate 2 and is pivotally movable about an axis 10. One arm 9a of the lever 9 engages, by means of a bent-off lug 9b, a stop or shoulder 6a on the driving disk 6, whereas the other arm 9c of the lever 9 engages a pin 12 of a release lever 13 under the action of a spring 11. The release lever 13 is also rotatably positioned about an axis 14 provided on the shutter base plate 2, and is biased or urged in a clockwise direction by a spring 15.

In accordance with the invention, the camera shutter construction as shown is provided with a releasable locking device or interlock, which may be rendered inoperative by means of the reversing or selector ring 3 in response to the said ring being fully set at either the "automatic" or the "non-automatic" position.

This interlock may advantageously comprise the release lever 13 shown in FIG. 1, such lever comprising an arm 13a which is receivable in an opening or recess 1a provided in the side wall of the shutter housing 1. The arm 13 cooperates with the selector and manual diaphragm setting ring 3, which ring is disposed in the plane of motion of the release lever 13, in such a manner that the arm 13a thereof is juxtaposed to and may abut the inner periphery of the ring 3 when the latter is in any of a number of positions other than either the indicated "automatic" or "non-automatic" positions, thereby to prevent operation, against the action of the spring 15, of the camera or shutter release lever 13. However, if the selector and diaphragm setting ring 3 is in one of the above-mentioned marked or indicated setting positions, either of the recesses 3a or 3b provided in the inner periphery of the ring 3 will be juxtaposed and available to the arm 13a whereby the latter may be moved into the said recess for the purpose of enabling the shutter release device to be operative. The recess 3a is associated with the "Auto" position of the ring 3, whereas the opening or recess 3b, whose length circumferentially of the ring corresponds to that of the diaphragm scale 5, is positioned to receive the arm 13a when the ring 3 is in the "Man" position.

The special advantage of a releasable locking device constructed in the above described manner resides in the fact that the structure and arrangement necessary requires practically no additional expenditure in the way of structural members, nor any additional space.

This is also true of the additional locking device shown in FIGS. 2 and 3, which acts on the selector ring 3, wherein the arm which is receivable in the recesses 3a and 3b of the selector and manual diaphragm setting ring 3 is provided not on the release lever 13 but instead on the arresting lever 9, said arm being given the reference numeral 9d. The mode of operation of the device otherwise completely corresponds to that of the device shown in FIG. 1.

As already mentioned, the structure and details of the mechanism which is used for obtaining photographs involving either automatic or non-automatic exposure settings is not shown in the figures for reasons of clarity of illustration. In many instances these devices are so constructed that a change from one kind of setting to the other must be effected only if the camera shutter is in the cocked condition.

In order to insure this in an absolutely dependable manner without inconveniencing the operator, the invention provides an additional locking device which permits shifting of the selector ring 3 from the "automatic" to the "non-automatic" position and vice versa only if the camera shutter is cocked.

Such an additional locking function, without involving any additional expenditure, is obtained in FIGS. 1 and 2 by arranging the additional locking device for the selector ring 3 as the arm 9d of the arresting lever 9 which retains the main driving disk 6 of the shutter drive mechanism in the cocked position, said arm cooperating with the recesses 3a and 3b of the selector ring 3. For this purpose, the lever 9 is, by means of the lug 9b, adapted to engage, in the non-loaded or run-down position of the driving disk 6 the periphery of the disk whereby the arm 9d of the lever is maintained in either the recess 3a or the recess 3b of the selector ring (FIG. 3). The additional locking device is released in response to the cocking or setting of the shutter drive mechanism, since the lever 9 for such condition is swung counterclockwise as a consequence of the lug 9b of the lever being brought into engagement with the projection or shoulder 6a of the driving disk 6, whereby such lug is located nearer to the axis 7 of the driving disk. This disposition of the arresting lug 9b results in a sufficient counterclockwise swinging movement of the lever 9 to cause the arm 9d to be shifted out of either the recess 3a or the recess 3b (FIG. 2) which it had occupied for the discharge or run-down condition of the driving disk 6.

It will now be understood from the foregoing that there has been provided in a simplified manner an advantageous interlock construction in a photographic camera, by which there is prevented inadvertent or accidental operation of the shutter and exposure of the film whenever the selector device 3 is not properly positioned, either for effecting a manual setting or else for effecting automatic setting in accordance with existing light conditions. Also, there is prevented shifting of the selector member 3 between the "automatic" and the "non-automatic" positions unless the shutter drive mechanism is first reset to its cocked position. By virtue of such locking or interlocking devices the operation of the camera is made more foolproof, and the operator is relieved of a number of mental processes which are otherwise required in cameras not having the above described means.

I claim:

1. In a photographic camera of the type having a camera shutter release device, and having mechanisms for effecting both automatic and non-automatic exposure settings, in combination, a locking means for preventing operation of said shutter release device; a manually operable selector member settable in an "automatic" position and a different, "non-automatic" position and adapted to occupy other positions as well; and means rendering inoperative said locking means for the shutter release device only when the selector member is in the "automatic" and "non-automatic" positions.

2. A camera as in claim 1, in which the shutter release device includes a part which moves to effect release of the shutter, and in which the selector member has portions comprising said locking means, disposed in the path of movement of the said part to prevent such movement when said member is in the said other positions.

3. In a photographic camera of the type having a camera shutter release device, and having mechanisms for effecting both automatic and non-automatic exposure settings, in combination, a manually operable selector member settable in different "automatic" and "non-automatic" positions and in other positions; means rendering inoperative said shutter release device when the selector member is in any of the said other positions, said shutter release device including a part which moves to effect release of the shutter and said selector member having portions disposed in the path of movement of the said part to prevent such movement when the selector member is in the said other positions; and means including a component which moves in response to cocking of the shutter, for blocking a movement of said selector member from either the "automatic" or the "non-automatic" position thereof when the shutter is uncocked.

4. A camera as in claim 3, in which the means for blocking the movement of the selector member includes the said movable part of the shutter release device, and in which the said component constitutes a portion of the shutter driving mechanism of the camera.

References Cited in the file of this patent
UNITED STATES PATENTS
2,213,742    Mihalyi  ---------------- Sept. 3, 1940